(12) United States Patent
Pickhardt et al.

(10) Patent No.: US 12,548,421 B2
(45) Date of Patent: Feb. 10, 2026

(54) METHOD AND MONITORING SYSTEM FOR AUTOMATICALLY MONITORING A WORKING AND/OR STORAGE ENVIRONMENT OF AT LEAST ONE MOBILE COMPONENT OF A GARDENING, FORESTRY, CONSTRUCTION, GROUND-PROCESSING AND/OR TRANSPORT SYSTEM

(71) Applicant: Andreas Stihl AG & Co. KG, Waiblingen (DE)

(72) Inventors: Moritz Pickhardt, Kiel (DE); Christian Spindler, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 20 days.

(21) Appl. No.: 18/216,651

(22) Filed: Jun. 30, 2023

(65) Prior Publication Data

US 2024/0005756 A1 Jan. 4, 2024

(30) Foreign Application Priority Data

Jul. 4, 2022 (DE) ...................... 10 2022 206 823.8

(51) Int. Cl.
*G08B 17/00* (2006.01)
*A62C 3/02* (2006.01)

(52) U.S. Cl.
CPC ............ *G08B 17/00* (2013.01); *A62C 3/0271* (2013.01)

(58) Field of Classification Search
CPC ........ G08B 17/00; G08B 17/06; G08B 25/10; A62C 3/0271; G01K 13/00
See application file for complete search history.

(56) References Cited

U.S. PATENT DOCUMENTS 10,408,884 B2   9/2019  Willey
2007/0296570 A1  12/2007  Barrieau et al.
(Continued)

FOREIGN PATENT DOCUMENTS

DE    10 2016 212 645 A1   1/2018
DE    10 2018 100 579 A1   7/2019
(Continued)

OTHER PUBLICATIONS

"Fire Protection in the Warehouse", VdS Verlag, VdS 2199, Sep. 1998, vol. 2, pp. 1-38, with English Translation (38 pages).

*Primary Examiner* — James J Yang
(74) *Attorney, Agent, or Firm* — Crowell & Moring LLP

(57) ABSTRACT

A method automatically monitors a working and/or storage environment of at least one mobile component of a gardening, forestry, construction, ground-processing and/or transport system that includes at least one motor-powered gardening, forestry, construction, ground-processing and/or mobile transport device. The component has a temperature sensor designed to detect a temperature of the working and/or storage environment. The method a) detects the temperature using the temperature sensor, and b) if a set of ambient fire criteria is met, wherein the set of ambient fire criteria is characteristic of a fire in the working and/or storage environment and includes at least one fire temperature criterion, wherein the fire temperature criterion is to be met by the detected temperature or a quantity based on the detected temperature, outputs and/or transmits an ambient fire alarm signal to a fire alarm system.

19 Claims, 2 Drawing Sheets

(56) References Cited

U.S. PATENT DOCUMENTS

| | | | |
|---|---|---|---|
| 2011/0087517 A1* | 4/2011 | Abbott | G05B 23/0283 |
| | | | 703/7 |
| 2017/0064524 A1* | 3/2017 | Chu | H04W 68/005 |
| 2019/0228641 A1* | 7/2019 | Lehning | G08B 17/06 |
| 2019/0294165 A1 | 9/2019 | Hofmann et al. | |
| 2020/0346057 A1 | 11/2020 | Westphal et al. | |
| 2020/0391061 A1 | 12/2020 | Enejehlm et al. | |

FOREIGN PATENT DOCUMENTS

| | | |
|---|---|---|
| EP | 3 687 024 A1 | 7/2020 |
| EP | 3 731 198 A | 10/2020 |

\* cited by examiner

METHOD AND MONITORING SYSTEM FOR AUTOMATICALLY MONITORING A WORKING AND/OR STORAGE ENVIRONMENT OF AT LEAST ONE MOBILE COMPONENT OF A GARDENING, FORESTRY, CONSTRUCTION, GROUND-PROCESSING AND/OR TRANSPORT SYSTEM

CROSS REFERENCE TO RELATED APPLICATION

This application claims priority under 35 U.S.C. § 119 from German Patent Application No. 102022206823.8, filed Jul. 4, 2022, the entire disclosure of which is herein expressly incorporated by reference.

BACKGROUND AND SUMMARY

The invention relates to a method and a monitoring system, in particular in each case, for automatically monitoring a working and/or storage environment of at least one mobile component of a gardening, forestry, construction, ground-processing and/or transport system comprising at least one motor-powered gardening, forestry, construction, ground-processing and/or mobile transport device and a system comprising such a monitoring system.

The object of the invention is to provide a method and a monitoring system, in particular in each case, for automatically monitoring a working and/or storage environment of at least one mobile component of a gardening, forestry, construction, ground-processing and/or transport system comprising at least one motor-powered gardening, forestry, construction, ground-processing and/or mobile transport device, and a system comprising such a monitoring system. The method and the monitoring system should have improved properties in each case.

The invention achieves this object by providing a method and a monitoring system described in the independent claims. Advantageous extensions and/or embodiments of the invention are specified in the dependent claims.

The method according to the invention is designed for automatically monitoring a working and/or storage environment of at least one mobile component of a gardening, forestry, construction, ground-processing and/or transport system comprising at least one motor-powered gardening, forestry, construction, ground-processing and/or mobile transport device. The component comprises a temperature sensor. The temperature sensor is designed to detect a temperature, in particular a value of the temperature, of the working and/or storage environment. The method consists of the following steps: a) detecting the temperature using the temperature sensor. b) if, in particular at least or only, one set of ambient fire criteria is met, wherein the set of ambient fire criteria is characteristic of a fire in the working and/or storage environment and comprises at least, in particular only one, in particular single fire temperature criterion, wherein the fire temperature criterion is to be met by, in particular at least or only, in particular either, the detected temperature or a quantity based on the detected temperature, outputting and/or transmitting an ambient fire alarm signal, in particular a content of the ambient fire alarm signal, to a fire alarm system.

This enables the fire to be detected in the working and/or storage environment at an early stage, in particular independently of the presence of personnel, in particular by means of the temperature sensor of the mobile component and/or without a permanently installed fire alarm, as can be typical in the working and/or storage environment. This therefore enables measures or responses to be initiated or triggered, in particular automatically, in particular by means of the fire alarm system.

In particular, the method, step a), step b), the detection, the output and/or the transmission can be automatic and/or be carried out permanently or continuously and/or repeatedly, in particular multiple times.

Step b) can be executed after step a).

The working environment can be a workshop environment.

The term "portable" can be used synonymously for the term "mobile".

The term "part" can be used synonymously for the term "component".

Mobile component can mean that the component may have a maximum mass of 50 kilogrammes (kg), in particular a maximum of 20 kg, in particular a maximum of 10 kg, in particular a maximum of 5 kg, and/or a minimum of 0.2 kg, in particular a minimum of 0.5 kg, in particular a minimum of 1 kg, in particular a minimum of 2 kg.

The component and the gardening, forestry, construction, ground-processing and/or transport device may be designed for the in particular tool-free and/or non-destructive, releasable and/or non-releasable, in particular mechanical and/or electrical, connection to each other, in particular attachment to each other, in particular connected to each other.

The component, the gardening, forestry, construction, ground-processing and/or transport system, the gardening, forestry, construction, ground-processing and/or transport device, the temperature sensor, and/or the fire alarm system may be electrical.

The component may have an electrical energy store, in particular a battery, in particular a button cell, for supplying it with electrical energy, in particular for the detecting, outputting and/or transmitting.

The term "contains" or "comprises" or "has" can be used interchangeably for the term "comprises".

The partial term "pickup" can be used synonymously for the partial term "sensor".

The temperature sensor may be designed to provide an, in particular post-processable and/or electrical, signal as a measure of the temperature.

The term "configured" can be used synonymously for the term "designed".

The set of ambient fire criteria can be specified, in particular at the factory.

The term "indicative" can be used synonymously for the term "characteristic".

The ambient fire alarm signal can be perceptible to people or users.

The fire alarm system can have a fire alarm control room.

The fire detection system may be located remotely from or not in the working and/or storage environment.

In addition, the ambient fire alarm signal can be issued in the working and/or storage environment.

If the set of ambient fire criteria is not met, the ambient fire alarm signal need not or cannot be output and/or transmitted.

In a refinement of the invention, the at least one fire temperature criterion is characteristic of exceeding a fire temperature limit, in particular of at least 80° C. (degrees Celsius), in particular at least 100° C., and/or a fire temperature rate of increase limit, in particular of at least 1.5° C./s (degrees Celsius or Kelvin per second), in particular at least 3° C./s, in particular in the working and/or storage environment. In particular, the at least one fire temperature criterion is the exceeding of the fire temperature limit and/or the fire temperature rate of increase limit. This allows the fire to be easily detected. In particular, the term "minimally" can be used synonymously for the term "at least".

In one refinement, in particular in one embodiment of the invention, the set of ambient fire criteria comprises at least one further criterion in addition to the fire temperature criterion, in particular, the fire temperature criterion characteristic of the exceeding of the fire temperature limit and in addition, a further fire temperature criterion characteristic of the exceeding of the fire temperature rate of increase limit. This enables a risk of an incorrect or false alarm to be reduced. In particular, the further criterion may be different, in particular of a different type, from the fire temperature criterion.

In a refinement of the invention, the component heats up due to its operation. The temperature sensor is designed to detect the temperature of the component. The method comprises the step of: detecting operational and/or non-operational data, in particular at least one value of the operational and/or non-operational data, of the operation and/or non-operation of the component, in particular synchronously with step a). The operational and/or non-operational data are of a different type than the temperature or the temperature-based quantity. In particular, the detection can be automatic and/or carried out permanently or continuously and/or repeatedly, in particular multiple times. In addition or alternatively, the operational and/or non-operational data can have, in particular be, an operating runtime or operating hours and/or operating times of the component, during which the component may be in operation. In addition or alternatively, the component may comprise an, in particular electrical, detection and/or evaluation device. The detection and/or evaluation device can be designed to detect at least one, in particular physical, quantity, wherein the quantity may be dependent on an operating state of the component, and to evaluate the detected quantity for determining the operational and/or non-operational data, and/or to detect the operational and/or non-operational data. In particular, the detection and/or evaluation device may be different, in particular of a different type, from the temperature sensor.

In addition, the set of ambient fire criteria comprises a minimum and/or non-operational criterion. The minimum and/or non-operational criterion is characteristic of a minimum and/or non-operational operation of the component, in particular of a minimum non-operational period, and is to be met by, in particular, either the detected operational and/or non-operational data or a quantity based on the detected operational and/or non-operational data. This allows the operation of the component to be ruled out as a cause of an increase in the temperature. In addition or alternatively, in particular therefore, this enables the risk of incorrect or false alarms to be reduced. In particular, the minimal and/or non-operational criterion may be different, in particular of a different type, from the fire temperature criterion. In addition or alternatively, the minimal and/or non-operational criterion may be characteristic of the exceeding of a limit value of the minimum non-operational period, in particular of at least 10 s (seconds).

As a further addition or alternative, the method comprises the step: if, in particular at least or only, one set of component overheating criteria is met, the set of component overheating criteria being characteristic of an overheating of the component due to its operation, in particular for a minimum operating period, and is to be met by, in particular at least or only, in particular either the detected temperature or the quantity based on the detected temperature and by, in particular either, the detected operational and/or non-operational data or a quantity based on the detected operational and/or non-operational data, outputting and/or transmitting a component overheating warning signal, in particular a content of the component overheating warning signal, in particular after step a). The component overheating warning signal is different from the ambient fire alarm signal. This enables a synergy effect of the temperature sensor. In addition or alternatively, this enables the overheating of the component to be detected, in particular with the operation of the component as the cause. In particular, the set of component overheating criteria may be at least partially, in particular completely, different from the set of ambient fire criteria. In addition or alternatively, the set of component overheating criteria may be specified, in particular at the factory. In addition or alternatively, the set of component overheating criteria can be characteristic of the exceeding of a limit value of the minimum operating period, in particular of at least 10 s. In addition or alternatively, the component overheating warning signal can be output and/or transmitted automatically and/or in the working and/or storage environment and/or to a user system, in particular different from the fire alarm system, and/or not to the fire alarm system and/or can be carried out permanently or continuously and/or repeatedly, in particular multiple times. Also in addition or alternatively, the component overheating warning signal can be perceptible to persons or users and/or comprise, in particular be, information about the overheating. If the set of component overheating criteria is not met, the component overheating warning signal need not or cannot be output and/or transmitted.

In a refinement of the invention, the component heats up due to its operation. The temperature sensor is designed to detect the temperature of the component. The method comprises the step: if, in particular at least or only, one set of component overheating criteria is met, and in particular the fire temperature criterion is not met, wherein the set of component overheating criteria is characteristic of an overheating of the component based on its operation and comprises at least, in particular only, one, in particular single, operational component overheating criterion, wherein the operational component overheating criterion is different from the fire temperature criterion and is to be met by, in particular at least or only, either the detected temperature or the quantity based on the detected temperature, outputting and/or transmitting a component overheating warning signal, in particular a content of the component overheating warning signal, in particular after step a). The component overheating warning signal is different from the ambient fire alarm signal. This enables a synergy effect of the temperature sensor. In addition or alternatively, this enables the overheating of the component to be detected. In particular, the set of component overheating criteria may be at least partially, in particular completely, different from the set of ambient fire criteria. In addition or alternatively, the set of component overheating criteria may be specified, in particular at the factory. Also in addition or alternatively, the component overheating warning signal can be output and/or transmitted automatically and/or in the working and/or storage environment and/or to a user system, in particular different from the fire alarm system, and/or not to the fire alarm system and/or can be carried out permanently or continuously and/or repeatedly, in particular multiple times. Also in addition or alternatively, the component overheating warning signal can be perceptible to persons or users and/or comprise, in particular be, information about the overheating. If the set of component overheating criteria is not met, the component overheating warning signal need not or cannot be output and/or transmitted.

In one embodiment of the invention, the operational overheating temperature criterion is characteristic of an operational overheating temperature range being reached, in particular with a maximum operational overheating temperature value equal to the fire temperature limit. In particular, the operational overheating temperature criterion is the operational overheating temperature range being reached. This allows the overheating to be easily detected. In particular, the operational overheating temperature range may comprise a minimum operational overheating temperature value, in particular of a maximum of 60° C., in particular a maximum of 40° C., and/or lower than the maximum operational overheating temperature value.

In a refinement of the invention, the gardening, forestry, construction, ground-processing and/or transport system comprises at least one further mobile component, in particular a further, in particular different type, motor-powered gardening, forestry, construction, ground-processing and/or mobile transport device. The further component comprises a further temperature sensor. The further temperature sensor is designed for detecting a further temperature, in particular a value of the further temperature, of the working and/or storage environment. The method comprises the step of: detecting the further temperature by means of the further temperature sensor, in particular synchronously with step a). The set of ambient fire criteria comprises a further fire temperature criterion. The further fire temperature criterion is to be met, in particular at least or only by, in particular, either the further detected temperature or a quantity based on the further detected temperature. This enables a risk of incorrect or false alarms to be reduced. In particular, the further component may be isolated or separate from the component. In particular, the detection can be automatic and/or carried out permanently or continuously and/or repeatedly, in particular multiple times. In addition or alternatively, the value of the additional temperature can correspond to the value of the temperature, in particular equal it. In addition or alternatively, the further fire temperature criterion can correspond to the fire temperature criterion, in particular be the same.

In one embodiment of the invention, the method comprises the step of: determining, in particular detecting, a spatial proximity, in particular a distance, in particular a value of the distance, between the component and the further component, in particular synchronously with step a). The set of ambient fire criteria comprises a proximity criterion. The proximity criterion is to be met, in particular at least or only by, in particular, either the determined spatial proximity or a quantity based on the determined spatial proximity. This means it is possible to recognise or ensure that the component and the further component are in the, in particular the same, working and/or storage environment and/or the increase in temperature and the increase in the further temperature are interrelated. In particular, the detection can be automatic and/or carried out permanently or continuously and/or repeatedly, in particular multiple times. In addition or alternatively, the proximity criterion can be different from the fire temperature criterion, in particular of a different type. Also in addition or alternatively, the proximity criterion can be a distance limit violation criterion. The distance limit violation criterion can be characteristic of a violation of a distance limit, in particular of a maximum of 50 m (metres), in particular a maximum of 20 m, in particular a maximum of 10 m.

In one embodiment of the invention, the component comprises a transmission device. The transmission device is designed for wireless transmission, in particular of at least or only the detected temperature, the quantity based on the detected temperature, information based thereon, and/or the ambient fire alarm signal. In addition or alternatively, the additional component comprises a further transmission device. The further transmission device is designed for wireless transmission, in particular of at least or only the further detected temperature, the quantity based on the further detected temperature, and/or further information based thereon. The spatial proximity is determined depending on the wireless transmission. This allows the spatial proximity to be easily determined. In particular, the, in particular further, transmission device can be electrical. In addition or alternatively, the term "wireless" can be used synonymously for the term "cable-free". Also addition or alternatively, the transmission can be automatic and/or carried out permanently or continuously and/or repeatedly, in particular multiple times.

In a refinement of the invention, the transmission is wireless, at least in some sections, in particular completely, in particular by means of Bluetooth transmission technology and/or Wireless Local-Area Network transmission technology and/or Long-Range transmission technology and/or mobile radio transmission technology and/or narrow-band Internet-of-Things transmission technology. In addition or alternatively, the output is acoustic. This allows the transmission to take place without a fixed installation, as can be typical in the working and/or storage environment. In addition or alternatively, this allows the ambient fire alarm signal to be easily perceived.

In a refinement of the invention, the transmission is carried out via an, in particular mobile, transmission intermediate station. This allows the component, in particular its transmission device, not to have to be transmitted far. In particular, the transmission intermediate station may be isolated or separate from the component. In addition or alternatively, the transmission intermediate station may be in the working and/or storage environment. In addition or alternatively, the transmission intermediate station may comprise, in particular be, a gateway.

In a refinement of the invention, the component is the, in particular electrically powered, gardening, forestry, construction, ground-processing and/or transport device, a drive battery pack for supplying the gardening, forestry, construction, ground-processing and/or transport device with electrical drive power, or a charger for supplying or charging the drive battery pack with electrical charging power. With such a component, the method can be particularly advantageous, or the fire can be easily detected. In particular, the gardening, forestry, construction, ground-processing and/or transport device can be ground-guided and/or manually guided, in particular hand-held, and/or autonomous. In particular, the term hand-held, in particular hand-carried, gardening, forestry, construction, ground-processing and/or transport device can mean that the gardening, forestry, construction, ground-processing and/or transport device may have a mass of a maximum of 50 kg, in particular a maximum of 20 kg, in particular a maximum of 10 kg, in particular a maximum of 5 kg, and/or a minimum of 1 kg, in particular a minimum of 2 kg. In addition or alternatively, the gardening, forestry, construction and/or ground-processing device can be mobile and/or can be a saw, in particular a chainsaw, or a pruner, or a hedge trimmer, or a hedge cutter, or a wood cutter, or a pair of pruning shears, or a blower, or a leaf blower, or a suction device, or a leaf vacuum cleaner, or a cleaning device, or a pressure washer, or a brush roller, or a sweeping brush, or a lawnmower, in particular a robot lawnmower, or a brushcutter, or a scarifier, or an angle grinder, or a motor hoe, or a high-pressure washer, or a sprayer or sprinkler, or a drill. In addition or alternatively, the transport device can be an e-scooter, or an e-bike. Also in addition or alternatively, the drive battery pack can be rechargeable.

The monitoring system according to the invention is designed for automatically monitoring an, in particular the, working and/or storage environment of at least one, in particular the, mobile component of an, in particular the, gardening, forestry, construction, ground-processing and/or transport system comprising at least one, in particular the, motor-powered gardening, forestry, construction, ground-processing and/or mobile transport device. The component comprises an, in particular the, temperature sensor. The temperature sensor is designed to detect an, in particular the, temperature of the working and/or storage environment. The monitoring system is designed for carrying out, in particular automatically, an, in particular the, method as mentioned above.

The monitoring system may provide the same advantage(s) as mentioned above for the method.

In particular, the monitoring system may have an, in particular electrical, computing and/or storage device.

The system according to the invention comprises an, in particular the, monitoring system as mentioned above and at least the component, in particular the gardening, forestry, construction, ground-processing and/or transport system, and/or the fire alarm system, and in particular the transmission intermediate station.

In particular, the component, in particular the gardening, forestry, construction, ground-processing and/or transport system, can be designed as described above for the method.

Further advantages and aspects of the invention are derived from the claims and from the description of exemplary embodiments of the invention, which are explained below by reference to the figures. In the drawings:

DETAILED DESCRIPTION OF THE DRAWINGS

Figure 1:
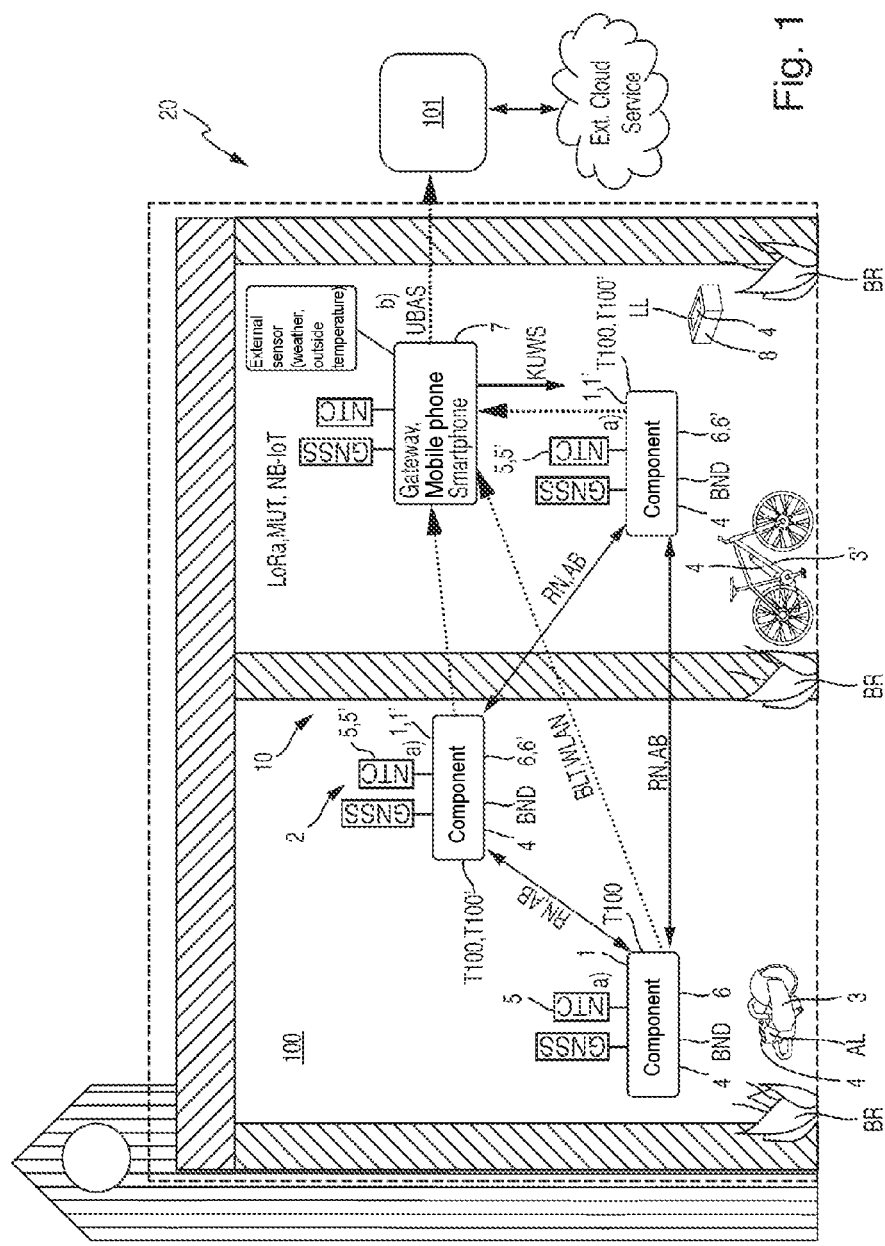
FIG. 1 schematically shows an exemplary system and method according to the invention comprising a monitoring system.
Figure 2:
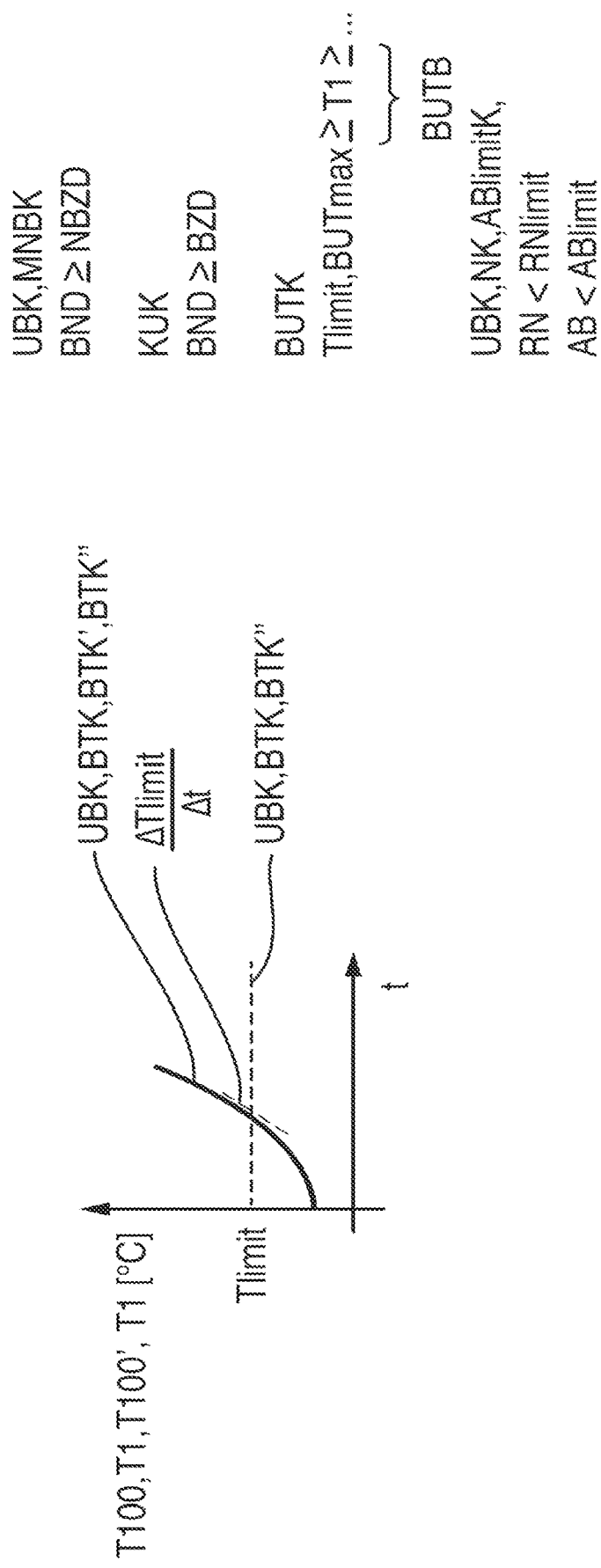
FIG. 2 schematically shows a set of ambient fire criteria having at least one fire temperature criterion of the method of FIG. 1.

FIGS. 1 and 2 show a method and a monitoring system 10 for automatically monitoring a working and/or storage environment 100 of at least one mobile component 1 of a gardening, forestry, construction, ground-processing and/or transport system 2 comprising at least one motor-powered gardening, forestry, construction, ground-processing and/or mobile transport device 3. The component 1 comprises a temperature sensor 5. The temperature sensor 5 is designed to detect a temperature T100 of the working and/or storage environment 100, in particular detects said temperature.

The method consists of the steps: a) detecting the temperature T100 using the temperature sensor 5. b) if a set of ambient fire criteria UBK is met, wherein the set of ambient fire criteria UBK is characteristic of a fire BR in the working and/or storage environment 100 and comprises at least one fire temperature criterion BTK, wherein the fire temperature criterion BTK is to be met by the detected temperature T100 or a quantity based on the detected temperature, outputting and/or transmitting an ambient fire alarm signal UBAS to a fire alarm system 101.

The monitoring system 10 is designed to carry out the method, in particular, carries it out.

In detail, the at least one fire temperature criterion BTK is characteristic of the exceeding of a fire temperature limit, in particular of at least 80° C., in particular at least 100° C., and/or the exceeding of a fire temperature rate of increase limit $\Delta Tlimit/\Delta t$, in particular of at least 1.5° C./s, in particular at least 3° C./s.

Furthermore, the set of ambient fire criteria UBK comprises at least one further criterion BTK', MNBK, BTK", NK, ABlimitK in addition to the fire temperature criterion BTK, in particular the fire temperature criterion BTK characteristic of the exceeding of the fire temperature limit Tlimit and in addition, a further fire temperature criterion BTK' characteristic of the exceeding of the fire temperature rate of increase limit $\Delta Tlimit/\Delta t$.

Also, the component 1 heats up due to its operation. The temperature sensor 5 is designed to detect the temperature T1 of the component 1, in particular detects said temperature.

In addition, the method comprises the step of: detecting operational and/or non-operational data BND of the operation and/or non-operation of the component 1. The operational and/or non-operational data BND are of a different type than the temperature T1 or the temperature-based quantity.

In addition, the set of ambient fire criteria UBK comprises a minimum and/or non-operational criterion MNBK. The minimum and/or non-operational criterion MNBK is characteristic of a minimum and/or non-operation of the component 1, in particular for a minimum non-operational period NBZD, and is to be met by the detected operational and/or non-operational data BND or a quantity based on the detected operational and/or non-operational data.

The method also additionally or alternatively comprises the step: if a set of component overheating criteria KUK is met, and in particular the fire temperature criterion is not met, the set of component overheating criteria KUK being characteristic of an overheating of the component 1 due to its operation, in particular for a minimum operating period BZD, and is to be met by the detected temperature T1 or the quantity based on the detected temperature and by the detected operational and/or non-operational data BND or a quantity based on the detected operational and/or non-operational data, outputting and/or transmitting a component overheating warning signal KUWS. The component overheating warning signal KUWS is different from the ambient fire alarm signal UBAS.

In addition or alternatively, the set of component overheating criteria KUK comprises at least one operational overheating temperature criterion BUTK. The operational overheating temperature criterion BUTK is different from the fire temperature criterion BTK and is to be met by the detected temperature T1 or the quantity based on the detected temperature.

In detail, the operational overheating temperature criterion BUTK is characteristic of an operational overheating temperature range BUTB being reached, in particular with a maximum operational overheating temperature value BUTmax equal to the fire temperature limit Tlimit.

In addition, the gardening, forestry, construction, ground-processing and/or transport system 2 comprises at least one further mobile component 1', in particular a further, in particular different type, motor-powered gardening, forestry, construction, ground-processing and/or mobile transport device 3'. The further component 1' comprises a further temperature sensor 5'. The further temperature sensor 5' is designed to detect a further temperature T100' of the working and/or storage environment 100, in particular detects said temperature. The method comprises the step of: detecting the further temperature T100' using the further temperature sensor 5'. The set of ambient fire criteria UBK comprises a further fire temperature criterion BTK". The further fire temperature criterion BTK" is to be met by the further detected temperature T100' or a quantity based on the further detected temperature.

In detail, the method comprises the step of: determining, in particular acquiring, a spatial proximity RN, in particular a distance AB, between the component 1 and the further component 1'. The set of ambient fire criteria UBK comprises a proximity criterion NK, ABlimitK. The proximity criterion NK, ABlimitK is to be met by the determined spatial proximity RN or a quantity based on the determined spatial proximity. In particular, the proximity criterion NK is a distance limit violation criterion ABlimitK. The distance limit violation criterion ABlimitK is characteristic of a violation of a distance limit ABlimit.

In the illustrated exemplary embodiment, the further criterion is the further fire temperature criterion BTK', the minimum and/or non-operational criterion MNBK, the further fire temperature criterion BTK" and/or the proximity criterion NK, ABlimitK.

In detail, the component 1 comprises a transmission device 6. The transmission device 6 is designed for wireless transmission of, and in particular transmits, in particular the detected temperature T100, the quantity based on the detected temperature, information based thereon, and/or the ambient fire alarm signal UBAS. In addition or alternatively, the further component 1' has a further transmission device 6'. The further transmission device 6' is designed for wireless transmission of, and in particular transmits, in particular the further detected temperature T100', the quantity based on the further detected temperature, and/or further information based thereon. The spatial proximity RN is determined depending on the wireless transmission.

In addition or alternatively, the component 1 and the further component 1' comprise, in particular in each case, an, in particular electrical, position determination sensor for determining an, in particular respective, position, in particular a GNSS-receiver GNSS. The spatial proximity RN is determined depending on the determined positions.

Furthermore, the transmission is wireless at least in some sections, in particular by means of Bluetooth transmission technology BLT and/or Wireless Local-Area Network transmission technology WLAN and/or Long-Range transmission technology LoRa and/or mobile radio transmission technology MUT and/or narrow-band Internet-of-Things transmission technology NB-IoT. In addition or alternatively, the output is acoustic, in particular by means of a sound generator, in particular a loudspeaker, in particular of the monitoring system 10.

In addition, the transmission is carried out via an, in particular mobile, transmission intermediate station 7.

In the illustrated exemplary embodiment, it is determined by means of the transmission intermediate station 7 and/or a gateway, a mobile phone and/or a smartphone, whether or not the set of ambient fire criteria UBK and/or the set of component overheating criteria KUK, is/are met, in particular in each case. In alternative exemplary embodiments, by means of the component, of the gardening, forestry, construction, ground-processing and/or transport device, of the gardening, forestry, construction, ground-processing and/or transport system and/or an, in particular external, cloud, it can be determined whether or not the set of ambient fire criteria and/or the set of component overheating criteria is/are met. In particular, the cloud may be located remotely from or not in the working and/or storage environment.

Further, in the exemplary embodiment shown the ambient fire alarm signal UBAS and/or the component overheating warning signal KUWS are output and/or transmitted, in particular in each case, by means of the transmission intermediate station 7 and/or the gateway, the mobile phone and/or the smartphone. In alternative exemplary embodiments, the environmental fire alarm signal and/or the component overheating warning signal can be output and/or transmitted by means of the component of the gardening, forestry, construction, ground-processing and/or transport device and/or of the gardening, forestry, construction, ground-processing and/or transport system.

In addition, in the exemplary embodiment shown, the transmission from the component 1 to the transmission intermediate station 7 is carried out by means of Bluetooth transmission technology BLT and/or Wireless Local-Area Network transmission technology WLAN. In alternative embodiments, the transmission from the component, the gardening, forestry, construction, ground-processing and/or transport device and/or from the gardening, forestry, construction, ground-processing and/or transport system, in particular to the fire alarm system, can be carried out by means of Long-Range transmission technology and/or mobile radio transmission technology and/or narrow-band Internet-of-things transmission technology.

Furthermore, the component 1 is the, in particular electrically powered, gardening, forestry, construction, ground-processing and/or transport device 3 a drive battery pack 4 for supplying the gardening, forestry, construction, ground-processing and/or transport device 3 with electrical drive power AL, or a charger 8 for supplying the drive battery pack 4 with electrical charging power LL.

In the exemplary embodiment shown, the detected temperature T100, the quantity based on the detected temperature, a charging status and/or the determined position are transmitted from the component 1, in particular to the transmission intermediate station 7.

The system 20 according to the invention comprises the monitoring system 10 and at least the component 1, in particular the gardening, forestry, construction, ground-processing and/or transport system 2, and/or the fire alarm system 101 and in particular the transmission intermediate station 7.

As the exemplary embodiments shown and explained above make clear, the invention provides an advantageous method and an advantageous monitoring system, in particular in each case, for automatically monitoring a working and/or storage environment of at least one mobile component of a gardening, forestry, construction, ground-processing and/or transport system comprising at least one motor-powered gardening, forestry, construction, ground-processing and/or mobile transport device, and an advantageous system comprising such a monitoring system, which, in particular in each case, have improved properties.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for automatically monitoring a working and/or storage environment of a mobile component of a gardening, forestry, construction, ground-processing and/or transport system comprising at least one motor-powered gardening, forestry, construction, ground-processing and/or mobile transport device, the method comprising the steps of:
a) detecting, via a temperature sensor of the mobile component, a temperature of the working and/or storage environment, wherein the mobile component heats up due to its operation and the temperature sensor is designed to detect the temperature of the mobile component; and
b) outputting and/or transmitting an ambient fire alarm signal to a fire alarm system when a set of ambient fire criteria is met, wherein the set of ambient fire criteria is characteristic of a fire in the working and/or storage environment and comprises a fire temperature criterion, and wherein the at least one fire temperature criterion is to be met by the detected temperature or a quantity based on the detected temperature, wherein the method further comprises the step of:
detecting non-temperature operational and/or non-temperature non-operational data comprising one or more of an operating runtime or operating hours and/or operating times of the mobile component, the non-temperature operational and/or non-temperature non-operational data thus being of a different type than the detected temperature or the quantity based on the detected temperature, and wherein the set of ambient fire criteria further comprises a minimum and/or non-operational criterion, the minimum and/or non-operational criterion being characteristic of a minimal and/or non-operation of the mobile component and being met by the one or more of the operating runtime or operating hours and/or operating times of the mobile component, or by a quantity based on the one or more of the operating runtime or operating hours and/or operating times of the mobile component.

2. The method according to claim 1, wherein the at least one fire temperature criterion is characteristic of an exceeding of a fire temperature limit and/or an exceeding of a fire temperature rate of increase limit.

3. The method according to claim 2, wherein the fire temperature limit is at least 80° C. and/or the fire temperature rate of increase limit is at least 1.5° C./s.

4. The method according to claim 1, wherein the set of ambient fire criteria comprises at least one further criterion in addition to the fire temperature criterion.

5. The method according to claim 2, wherein the set of ambient fire criteria comprises the fire temperature criterion characteristic of the exceeding of the fire temperature limit and, in addition, a further fire temperature criterion characteristic of the exceeding of the fire temperature rate of increase limit.

6. The method according to claim 1,
wherein the method comprises the step of:
outputting and/or transmitting a component overheating warning signal when a set of component overheating criteria is met, the set of component overheating criteria being characteristic of an overheating of the mobile component due to its operation and being met by the detected temperature or the quantity based on the detected temperature and by the detected non-temperature operational and/or non-temperature non-operational data or a quantity based on the detected non-temperature operational and/or non-temperature non-operational data, wherein the component overheating warning signal is different from the ambient fire alarm signal.

7. The method according to claim 1,
wherein the method comprises the step of:
outputting and/or transmitting a component overheating warning signal when a set of component overheating criteria is met, and when the at least one fire temperature criterion is not met, wherein the set of component overheating criteria is characteristic of overheating of the mobile component due to its operation and comprises at least one operational overheating temperature criterion, the at least one operational overheating temperature criterion being different from the at least one fire temperature criterion and wherein said criterion is to be met by the detected temperature or the quantity based on the detected temperature, wherein the component overheating warning signal is different from the ambient fire alarm signal.

8. The method according to claim 7,
wherein the at least one fire temperature criterion is characteristic of an exceeding of a fire temperature limit, and
wherein the at least one operational overheating temperature criterion is characteristic of an operational overheating temperature range being reached with a maximum operational overheating temperature value equal to the fire temperature limit.

9. The method according to claim 1,
wherein the gardening, forestry, construction, ground-processing and/or transport system comprises at least one further mobile component, wherein the further mobile component comprises a further temperature sensor, the further temperature sensor being designed to detect a further temperature of the working and/or storage environment,
wherein the method comprises the step of:
detecting the further temperature of the working and/or storage environment using the further temperature sensor, and
wherein the set of ambient fire criteria comprises a further fire temperature criterion, wherein the further fire temperature criterion is to be met by the further detected temperature or a quantity based on the further detected temperature.

10. The method according to claim 9, wherein the method comprises the step of:
determining a spatial proximity between the mobile component and the further mobile component, and
wherein the set of ambient fire criteria comprises a proximity criterion, wherein the proximity criterion is to be met by the determined spatial proximity or a quantity based on the determined spatial proximity.

11. The method according to claim 10,
wherein the mobile component comprises a transmission device, the transmission device being designed for wireless transmission of the detected temperature, of a quantity based on the detected temperature, of information based thereon, and/or of the ambient fire alarm signal, and/or
wherein the further mobile component has a further transmission device, the further transmission device being designed for wireless transmission of the further detected temperature, of the quantity based on the further detected temperature, and/or of further information based thereon, and wherein the spatial proximity is determined depending on the wireless transmission.

12. The method according to claim 1, wherein the transmitting is wireless at least in part by use of Bluetooth transmission technology, Wireless Local-Area Network transmission technology, Long-Range transmission technology, mobile radio transmission technology, and/or narrow-band Internet-of-Things transmission technology, and/or wherein the outputting is acoustic.

13. The method according to claim 1, wherein the transmitting is carried out via a mobile transmission intermediate station.

14. The method according to claim 1, wherein the mobile component comprises an electrically powered, gardening, forestry, construction, ground-processing and/or transport device, a drive battery pack for supplying the gardening, forestry, construction, ground-processing and/or transport device with electrical drive power, or wherein the mobile component comprises a charger for supplying the drive battery pack with electrical charging power.

15. A monitoring system for automatically monitoring a working and/or storage environment of a mobile component of a gardening, forestry, construction, ground-processing and/or transport system, comprising:

the mobile component, wherein the mobile component heats up due to its operation and comprises a temperature sensor, the temperature sensor being designed to detect a temperature of the working and/or storage environment and of the mobile component, and wherein the monitoring system is operatively configured to:
  a) detect the temperature of the working and/or storage environment using the temperature sensor; and
  b) output and/or transmit an ambient fire alarm signal to a fire alarm system when a set of ambient fire criteria is met, wherein the set of ambient fire criteria is characteristic of a fire in the working and/or storage environment and comprises at least one fire temperature criterion, wherein the at least one fire temperature criterion is to be met by the detected temperature or a quantity based on the detected temperature, and wherein the monitoring system is further operatively configured to:
  detect non-temperature operational and/or non-temperature non-operational data comprising one or more of an operating runtime or operating hours and/or operating times of the mobile component, the non-temperature operational and/or non-temperature non-operational data thus being of a different type than the detected temperature or the quantity based on the detected temperature, and wherein the set of ambient fire criteria further comprises a minimum and/or non-operational criterion, the minimum and/or non-operational criterion being characteristic of a minimal and/or non-operation of the mobile component and being met by the one or more of the operating runtime or operating hours and/or operating times of the mobile component, or by a quantity based on the one or more of the operating runtime or operating hours and/or operating times of the mobile component.

16. A system, comprising:

the monitoring system according to claim 15; and the gardening, forestry, construction, ground-processing and/or transport system, and/or the fire alarm system.

17. The method according to claim 1, wherein the mobile component and the motor-powered gardening, forestry, construction, ground-processing and/or mobile transport device are configured for mechanical and electrical connection to one another.

18. The method according to claim 1, wherein the non-temperature operational and/or non-temperature non-operational data comprises one or more of:

an operating runtime or operating hours and/or operating times of the mobile component.

19. The method according to claim 1, wherein the mobile component comprises an electrical detection and/or evaluation device that detects a physical quantity dependent on an operating state of the component, and evaluates the physical quantity to determine the non-temperature operational and/or non-temperature non-operational data, and the electrical detection and/or evaluation device is different from the temperature sensor.

* * * * *